June 17, 1924.
E. H. JACOBS
1,498,169
SECTIONALIZING END BELL
Filed April 17, 1919
4 Sheets-Sheet 3
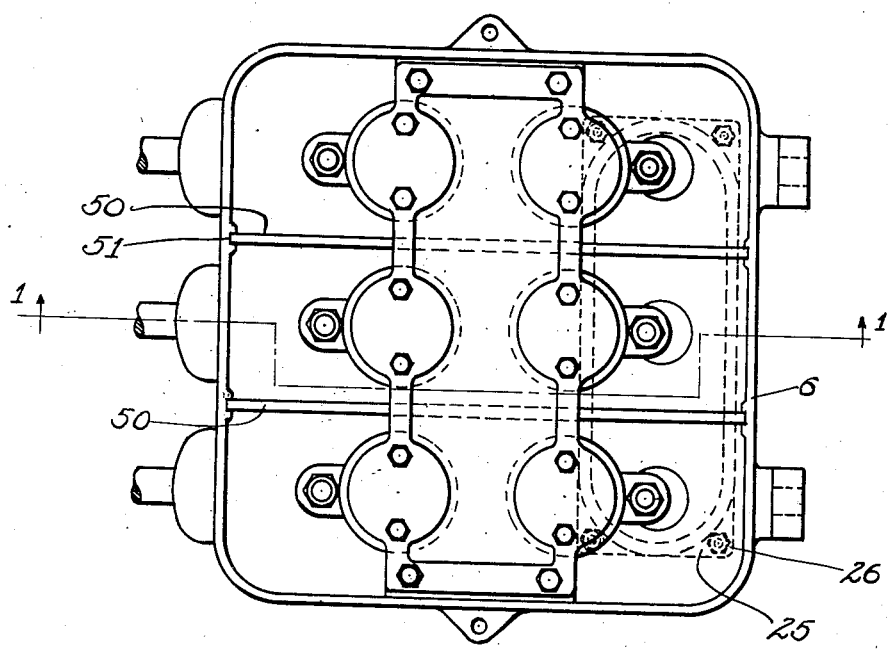
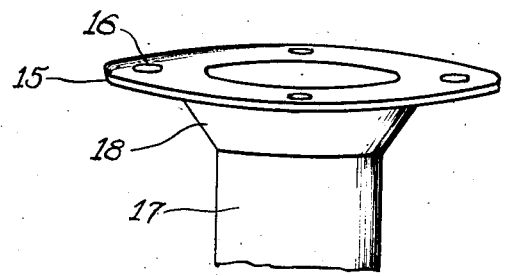
Inventor
Ernest H. Jacobs
By Brown Boettcher & Dienner
Attorneys June 17, 1924.
E. H. JACOBS
1,498,169
SECTIONALIZING END BELL
Filed April 17, 1919     4 Sheets-Sheet 4
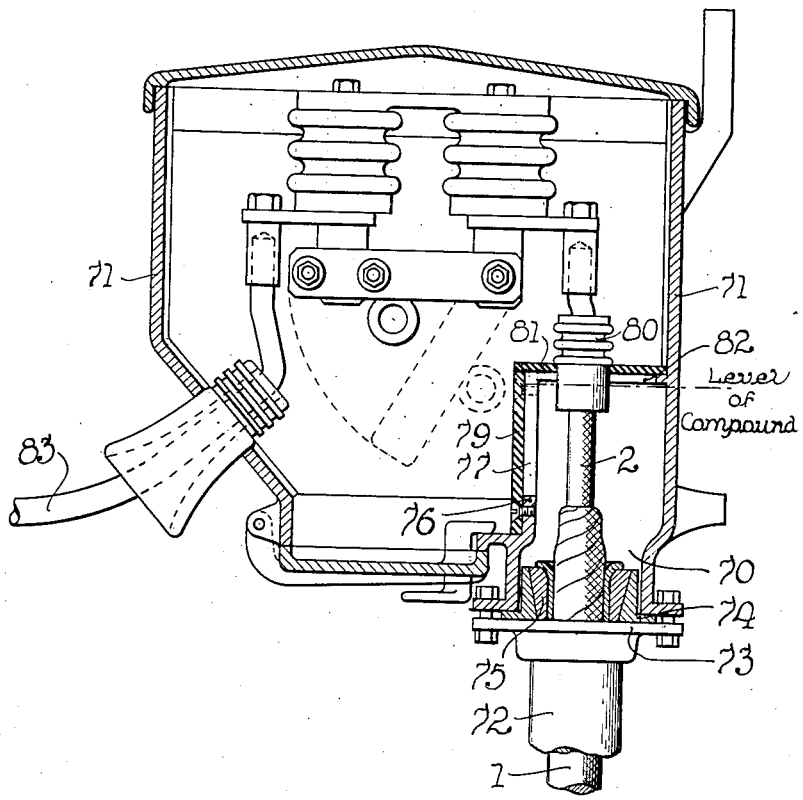
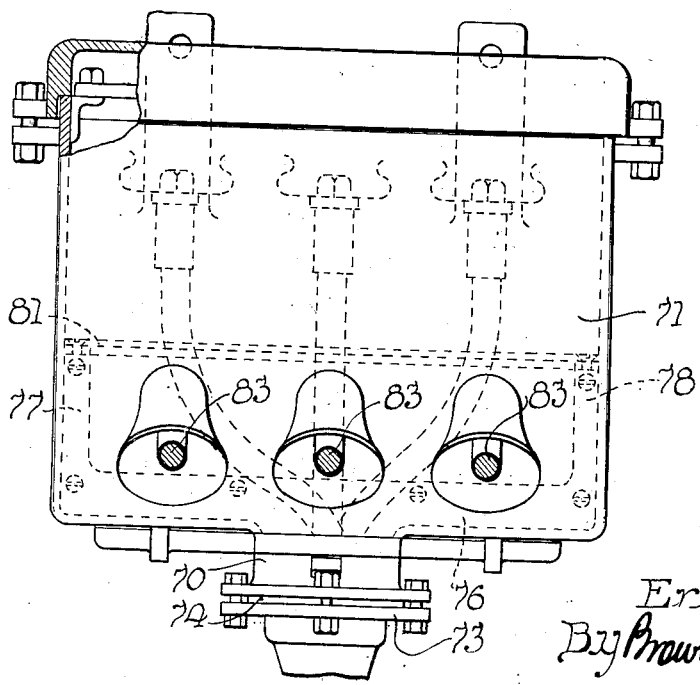
Inventor
Ernest H. Jacobs
By Brown Boettcher & Dienner
Attorneys Patented June 17, 1924.

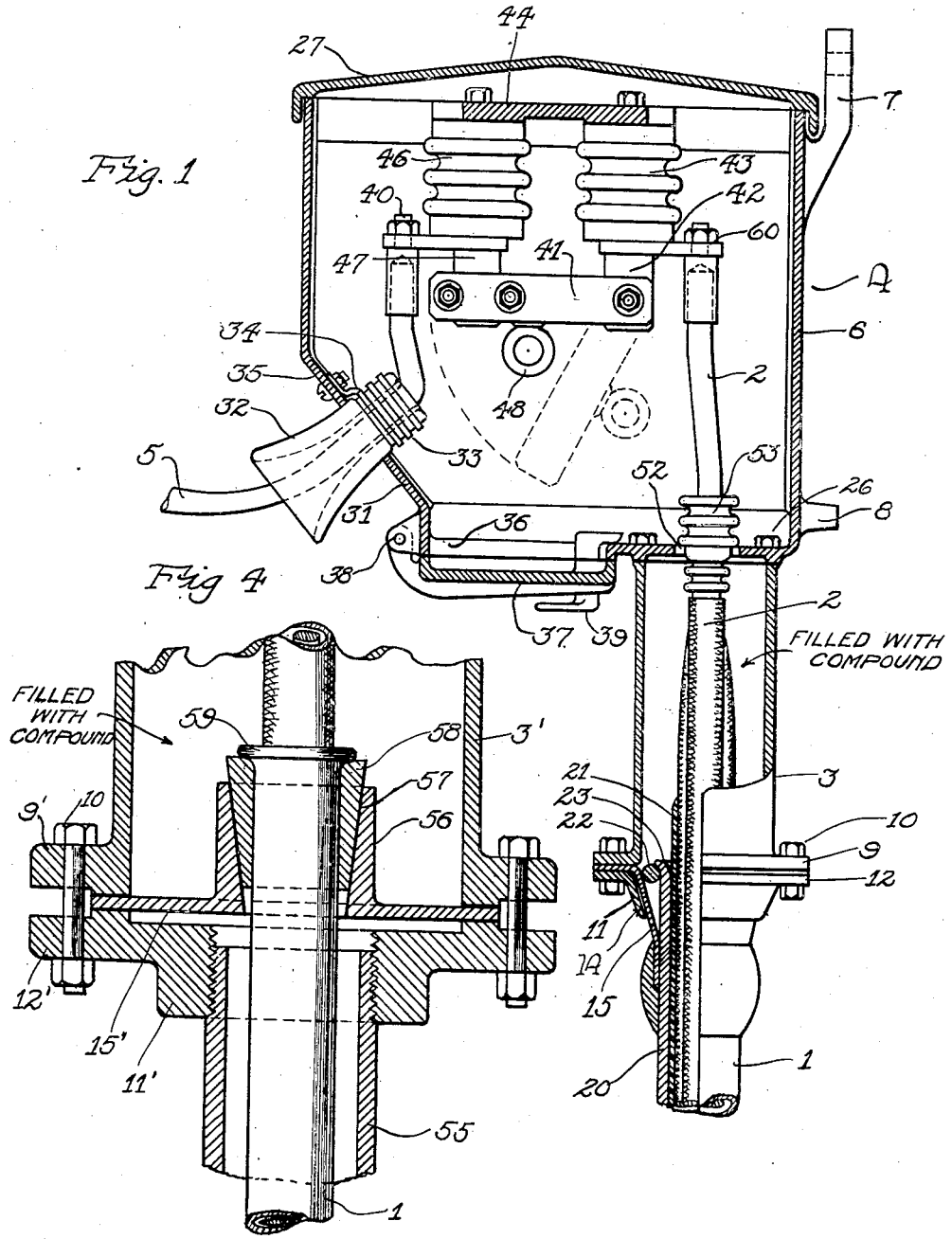

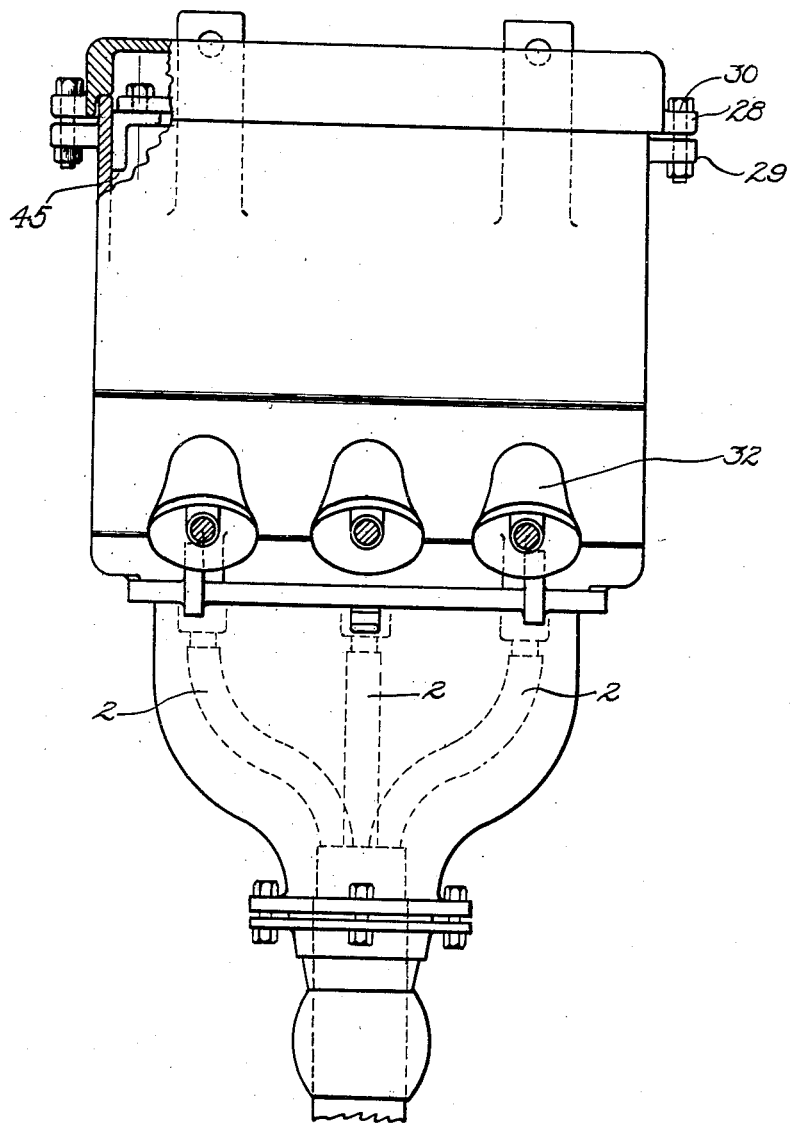

1,498,169

UNITED STATES PATENT OFFICE.

ERNEST H. JACOBS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

SECTIONALIZING END BELL.

Application filed April 17, 1919. Serial No. 290,887.

*To all whom it may concern:*

Be it known that I, ERNEST H. JACOBS, a citizen of the United States, residing in Chicago, in the county of Cook and State of Illinois, have invented a certain new and useful Improvement in Sectionalizing End Bells, of which the following is a full, clear, concise, and exact description, reference being had to the accompanying drawings, forming a part of this specification.

My invention relates to end bells for electrical cables, and particularly to a combined disconnecting and distributing device having means for joining an underground cable, such as a lead covered cable, with overhead wires and for disconnecting the cable from the aerial at the end of the cable.

The problem of joining underground cables to overhead or aerial wires has always presented considerable difficulty. Moisture must be excluded from the cable, otherwise the insulation of the cable will break down and damage to and disability of the cable will result. It has been common practice for a long time to lead the end of the cable into what is termed an end bell or pot head where the strands of the cable are separated and the end of the sheath is sealed with a moisture-proof insulating compound. The sheath of the cable is generally made of lead or an alloy of lead and tin, and has relatively little strength mechanically. This lead sheath is difficult to fasten and must not be subjected to any considerable mechanical strain. Numerous expedients have been proposed for joining the lead sheath to the bottom of the bell or pot head, the best and safest of which, perhaps, has been the formation of a wiped joint between the bottom of the bell and the sheath of the cable. Where a cast iron bowl or bell is employed, a wiped joint between the cast iron and the lead of the sheath is substantially impossible. One of the objects of my invention is to provide improved means for joining the lead of the cable sheath to the cast iron bowl or bell of the pot head.

Difficulty has also been experienced in disconnecting the cable from the aerial where such pot heads are employed, and various expedients have been proposed for making it possible to disconnect the aerial and the underground cable at the end of the cable.

It is a further object of my invention to provide a compact, neat and substantial disconnecting device in conjunction with the pot head or end bell for readily connecting and disconnecting the aerial from the cable.

In order to apprise those skilled in the art how to construct and operate my invention I shall now describe a specific embodiment of the same in connection with the accompanying drawings forming a part of the following specification.

Figure 1 is a vertical section thru the device of my invention;

Figure 2 is a front elevational view of the same;

Figure 3 is a plan view of the top of the disconnecting box with the cover removed to show the frame plate;

Figure 4 is a fragmentary vertical section thru a modified form of joint between the cable and the bottom of the bell;

Figure 5 is a perspective view of the lead joining plate and sleeve which is shown in section in Figure 1;

Figure 6 is a vertical section of a modification; and

Figure 7 is a fron elevational view of the same.

The lead covered cable 1, which is shown herein as having three conductors 2 is led upwardly from the underground conduit and is joined to the bowl member 3 which forms the main part of the pot head 4. The aerial wires 5 are led into the cast iron box 6 where connection is made to the strands of the cable, as will be described later. The combined box and bowl is adapted to be fastened on a pole or a cross arm as by means of the lugs 7 and brackets or legs 8.

The bowl member 3 is provided at its lower contracted portion with a flange 9 adapted to receive the bolts 10. A flanged bottom member 11 is secured by its flange 12 to the flange 9 by means of the bolts 10 to form in connection with the other parts, a closure for the bottom of the bowl 3. The lead cable projects up thru the bottom member 11 and is suitably secured to the pot head 4, as will be described later in detail. There are various sizes of lead covered cables, which differ in external diameter by a relatively small amount, which it is necessary to accommodate with one size of pot head. To this end I provide a lead plate and sleeve 15 which is shown in detail in Figure 5. The plate and sleeve member 15 comprises the flat annular plate member 16 and the cylindrical sleeve member 17, which members or portions are joined together by a conical seat member 18 formed integral with the parts 16 and 17.

The lead plate and sleeve member 15, which might be termed the sealing member, is adapted to form the actual closure between the bowl 3 and the lead sheath of the cable. This sealing member 15 being formed of soft lead is made with the cylindrical portion 17 of a size suitable to receive the maximum size of cable to be employed with the particular bell 3. For the smaller sizes of cable the cylindrical portion 17 may be contracted by a series of blows with a hammer or flat bar to contract the cylindrical portion 17 upon the lead sheath 20 of the cable.

In making the joint between the cable and the sealing member, the end of the cable is first prepared by cutting back the lead sheath 20 a suitable distance to permit the strands 2 to reach up thru the bowl 3 and into the box 6 by the desired amount. The insulation is then cut back, as indicated at 21 until the same projects only a short distance above the bottom of the bowl. The lead sealing member is then shrunk upon the lead sheath 20 and a wedging ring 22, which serves to hold the sealing sheath and also to ground the same, is wedged between the sheath portion 18 and the lead sheath. The upper edge of the lead sheath is flared out over the wedge ring 22 as indicated at 23. This serves the double purpose of lessening the electrostatic strains between the metal of the sheath and the stopper of the conductor, and also it serves to hold the wedging ring 22 in place and thus binds the cable.

The box member 6 and the bowl member 3 are bolted together by means of suitable flanges and bolts 25 and 26, shown in dotted lines in Figure 3.

The box 6 is formed with an open top, which top is provided with a suitable petticoated cover 27 clamped in place by means of the lugs or flanges 28 and 29, held together by suitable bolts 30. The box 6 is provided at its forward face with an inclined portion 31, which is overhung by the front part of the box. This inclined portion is provided with suitable outlets in which are placed downwardly and outwardly flared insulators 32. The aerial conductors 5 pass thru these insulators 32 into the interior of the box. The inner end of each insulator 32 is provided with a series of corrugations 33, each corrugation adapted to be received by a finger 34 held against the inclined portion by a screw bolt 35. These corrugations provide not only creepage surface, but also a suitable engaging surface.

In the bottom of the box 6, between the bowl member 3 and the insulators 32, I have formed an opening 36, which is adapted to be closed by the door 37, hinged to the box at 38. A suitable bolt or catch 39 is provided so that the door may be opened for the purpose of opening the disconnecting switch 40, which is mounted in the box. The disconnecting switch comprises a series of blades 41, one for each conductor passing thru the box 6, each blade 41 being pivoted upon a lug and pivot member 42, mounted on a suitable insulator 43, depending from the frame plate 44, which, as is shown in Figure 2 is bolted at its ends to suitable brackets 45. A cooperating lug and contact 47 is adapted to be engaged by the switch blade 41, this lug and contact 47 being suspended from the insulator 46, which is also mounted on the frame plate 44. The switch is provided with a ring or other suitable operating member 48, which may be reached by opening the door 37 for opening the circuit at the junction of the cable and the aerial.

As is clearly shown in Figure 3, the box 6 is divided up into a plurality of compartments, one for each conductor, these compartments being formed by partitions 50, set in suitable groves or dove-tails 51. The partitions 50 preferably are made of insulating material, and form barriers between the individual bridges and wires. The strands 2 of the cable are led up thru the top of the bowl 3 thru suitable openings 52 in the bottom of the box 6, and are connected to the switch terminals 42. The aerial wires 5 are similarly connected to the switch contact 47. A suitable insulating sleeve 53 guards the strands 2 against contact with the edges of the box 6 at the openings 52.

The bowl 3 is filled with insulating compound up to and including a part of the insulator 53, as full as it can be made.

In Figure 4 I have shown a modification in which the cable 1 is led up thru a pipe or conduit 55. The flanged bottom member 11' is provided with screw threads to make a suitable connection with the pipe or conduit 55. The sealing member 15' is clamped at its outer edges between the flanges 9' and 12', this sealing member being preferably made of cast iron. The sealing member 15' has a flange member 56 which projects upward and which has on its inner surface a conical seat 57 adapted to be engaged by a conical wedge ring 58, which serves the same purpose as the wedge ring 22 shown in Figure 1. The sheath of the cable is flared out as indicated at 59, over the top of the wedge ring 58 to insure the gripping of the cable by the wedge ring and also to lessen the electrostatic strains at that point. The wedge ring 58 is split or is made of a number of sections, so that cables of various diameters may be engaged and held in the seat 57. The bowl member 3' is also filled with compound.

The flanged bottom member 11, shown in Figure 1, is provided with a tapered conical portion 14, which is adapted to back up the conical seat 18 of the lead sealing member 15. The wedge ring 22 is split and is adapted to be forced down between the cable sheath and the sealing member so as to wedge the cable, regardless of its size against the conical seat 15, which is backed by the conical portion 14.

The operation of the device is obvious from the foregoing description. To disconnect the cable and the aerial wire, the door 37 is opened and a wooden stick with a pin thereon adapted to engage the ring 48 is introduced into the box 6 and the switch blade 41 is opened.

If it is desired to make any repairs on the end of the table, the parts may be readily disconnected as is apparent from the foregoing description. The top 27 may be removed, the strands 2 be disconnected by loosening the terminals 60, and the box 6 may be taken off of the bowl 3 by loosening the bolts 26.

In Figures 6 and 7 I have shown a modification wherein the length of the downwardly extending portion of the bowl member has been materially decreased to provide a relatively compact structure. In this form of construction the downwardly extending portion of the bowl member 70 is formed integral with the cast iron box 71 extending but a relatively short distance downwardly therefrom. The upper portion of the bowl member 70 is disposed within the cast iron box 71 adjacent the rear wall thereof, as will be described later.

The cable 1 is led up thru a pipe or conduit 72 which pipe or conduit makes suitable connection with the flanged member 73. The sealing member 74 is provided with a flange member projecting upwardly therefrom, which flange member is provided with a conical bore adapted to be engaged by a conical wedge ring 75. The sheath of the cable is flared out over the top of the wedge ring 75, as hereinbefore pointed out.

The bottom of the cast iron box 71 is provided with a vertical flange 76 extending longitudinally therealong. This flange 76 continues up along the opposite end walls of the box 71 as shown at 77 and 78 in Figure 7. A partition, 79 is bolted or otherwise suitably secured to the longitudinal portion 76 and vertical extensions 77 and 78 of the continuous flange or web thus provided. The partition 79, which is made of insulating material—preferably fibre—forms a longitudinal barrier through the box 71 defining the upper portion of the bowl member 70 longitudinally thru the box 71 and adjacent the rear wall thereof. This insulating partition or barrier effectively safeguards the circuit when the switch blade 41 is moved to the open or dotted line position, (Figure 6).

The strands 2 of the cable are led up thru the bowl 70 and thru suitable insulating sleeves 80, which insulating sleeves are mounted in a horizontal plate 81 preferably of insulating material covering the top of the bowl member 70. The plate 81 is mounted by means of suitable bolts upon a flange 82 formed integral with the box 71 and extending inwardly from the rear and end walls of the chamber 70 adjacent the upper edge thereof. Obviously a plurality of suitable spider members could be provided transversely across the top of the chamber 70 instead of the continuous plate 81 for supporting the insulating sleeves 80 if so desired.

The aerial wires 83 are led into the cast iron box 71, where connection is made to the strands of cable substantially as has been described in connection with Figures 1, 2 and 3.

I do not intend to be limited to the precise details of construction as shown and described.

I claim:

1. In combination, a closed container comprising a box having a removable cover, a door in the bottom of the box, a cable end bell opening into the box at one side of the door, outlet insulators on the other side of the door in the bottom of the box and conductors passing out thru said insulators.

2. In combination, a box having a removable cover, a supporting frame extending across the top of the box beneath the cover, said box having an opening in the bottom thereof, a door for the opening, a conductor inlet, insulating means for said inlet, said box having an overhanging wall adjacent said door, an outlet for outgoing wires in said wall, and an insulator in said latter outlet.

3. In a device of the class described, a box, a door in the box, said door being protected by an overhanging side of the box, and a cable end bell opening into the box to one side of the door and adapted to join a conductor leading from the box to a cable.

4. In combination, a box having an open top, a frame member extending across said open top, said frame member having a pair of insulators secured on the bottom surface thereof, a cover member for the box, said box having an opening in the bottom thereof, a door for closing said opening, an electric device supported on said insulators, conductors connected to the electric device and passing out thru the bottom of the box, insulating bushings surrounding said conductors and a cable end bell opening into the box and adapted to join one of said conductors to a cable.

5. In combination, a box having an open top, a frame member extending across the open top, a cover for said box, an electric device mounted on the lower side of said frame member, said box having an opening in the bottom thereof, and a door for said opening, said opening being directly below said electric device and conductors connected to said device, said conductors passing out thru the bottom of the box.

6. In a device of the class described, a box, a door in the box, a chamber or casing in said box, a flange at the lower end of said chamber or casing, a co-operating flange member, a cable having a metallic sheath, a wedge socket and wedge means adapted to seat in said socket and engage the cable.

7. In combination, a closed container, a door in the container for permitting access to the interior thereof, a conductor extending into the box and a cable end bell opening into the box and adapted to join said conductor to a cable.

8. In combination, a closed container comprising a box having a lid, an electrical device in the box, a door in the bottom of the box for permitting access to said device, a compartment adjacent the container, a cable end sealed in said compartment and conductor connected between said cable end and the electrical device in the box.

In witness whereof I hereunto subscribe my name this 8th day of April, A. D. 1919.

ERNEST H. JACOBS.